United States Patent [19]
Donoughe et al.

[11] Patent Number: 6,024,400
[45] Date of Patent: Feb. 15, 2000

[54] SUN VISOR ASSEMBLY WITH INTEGRATED COMPACT DISC STORAGE

[75] Inventors: Michael F. Donoughe, Rochester; Lawrence J. Sak, Oxford, both of Mich.

[73] Assignee: Chrysler Corporation, Auburn Hills, Mich.

[21] Appl. No.: 09/156,823

[22] Filed: Sep. 18, 1998

[51] Int. Cl.[7] .................................................. B60J 3/00
[52] U.S. Cl. ........................ 296/97.5; 296/37.8; 224/312
[58] Field of Search ................... 296/37.1, 37.8, 296/37.12, 97.1, 975; 224/312; D12/417; 206/308.1

[56] References Cited

U.S. PATENT DOCUMENTS

| | | | |
|---|---|---|---|
| D. 362,159 | 9/1995 | Singh | D6/629 |
| 2,901,038 | 8/1959 | Herr et al. | 160/354 |
| 4,998,767 | 3/1991 | Lawassani et al. | 296/97.1 |
| 5,590,827 | 1/1997 | Nimpoeno | 224/312 |
| 5,653,364 | 8/1997 | Eskandry | 224/312 |
| 5,762,246 | 6/1998 | Drew | 224/312 |

*Primary Examiner*—D. Glenn Dayoan
*Assistant Examiner*—Paul Chenevert
*Attorney, Agent, or Firm*—James R. Yee

[57] ABSTRACT

A sun visor assembly for a motor vehicle is adapted to store a plurality of compact discs. The sun visor assembly includes a central core and an outer fabric cover. The outer fabric cover surrounds the central core. The outer fabric cover includes an upper fabric member having a continuous length. The upper fabric member is folded over on itself to define a plurality of shingled pockets. Each pocket includes an opening for receiving one of the plurality of compact discs.

10 Claims, 3 Drawing Sheets

SUN VISOR ASSEMBLY WITH INTEGRATED COMPACT DISC STORAGE

BACKGROUND OF THE INVENTION

1. Technical Field

The present invention generally pertains to motor vehicles. More particular, the present invention pertains to the storage of compact discs within a motor vehicle. More specifically, but without restriction to the particular embodiment and/or use which is shown and described for purposes of illustration, the present invention relates to a sun visor assembly for a motor vehicle with integrated compact disc storage.

2. Discussion

With the increasing use of compact disc players in motor vehicles, there is a significant need for an arrangement which can store a plurality of compact discs in a convenient, easily accessible location. Furthermore, it is important that the arrangement be located in a position which allows the driver to keep his eyes substantially on the road while making a compact disc selection for use in the motor vehicle.

One particular compact disc storage device is shown in U.S. Pat. No. 5,762,246 to Drew. The device disclosed accommodates multiple compact discs and is removably attachable to a sun visor for a motor vehicle. The device is interconnected to the visor in such a manner as to allow the device to be temporarily pivoted upward and away from the visor to allow viewing or use of a vanity mirror which may be provided on the visor. The pivotal rotation permits viewing of the vanity mirror without requiring total removal of the storage device.

Another compact disc storage device is shown in U.S. Pat. No. 5,590,827 to Nimpoeno. This device is similarly removably attachable to a sun visor of a motor vehicle. As illustrated, the device defines a series of storage pockets and includes cooperating flaps having a hook and loop type fastening material for retention on a sun visor.

While known arrangements, including those discussed above, provide convenient manners for the storage of compact discs within a motor vehicle, they are all associated with disadvantages. For example, known arrangements are not integrally formed with the sun visor, thereby requiring multiple parts which increases costs and assembly time. In addition, known arrangements typically include seams which are susceptible to failure.

SUMMARY OF THE INVENTION

It is a general object of the present invention to provide an arrangement for compact disc storage within a motor vehicle which overcomes the disadvantages of the prior art, including but not limited to the disadvantages noted above.

It is another object of the present invention to provide a sun visor assembly with integrated compact disc storage.

It is another object of the present invention to provide an arrangement for storing a plurality of compact discs on a sun visor assembly of a motor vehicle having an improved construction which is less susceptible to failure.

In one form, the present invention provides a sun visor assembly for a motor vehicle adapted to store a plurality of compact discs. The sun visor assembly includes a central core and an outer fabric cover. The outer fabric cover surrounds the central core. The outer fabric cover includes an upper fabric member having a continuous length. The upper fabric member is folded over on itself to define a plurality of shingled pockets. Each pocket includes an opening for receiving one of the plurality of compact discs.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
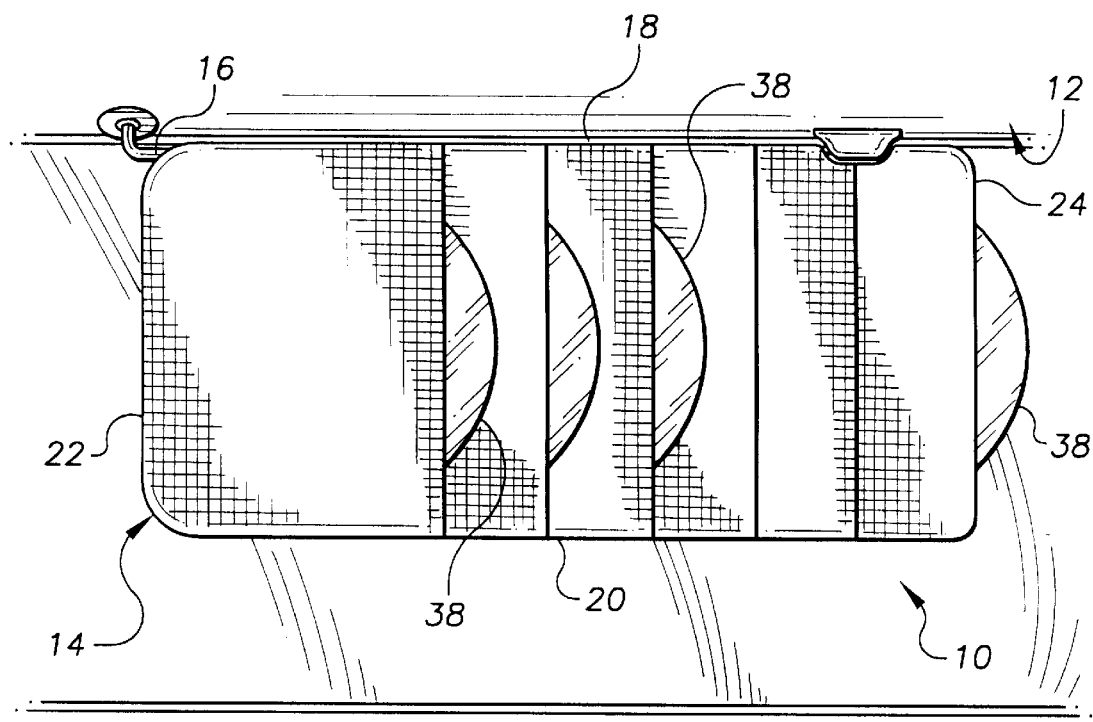
FIG. 1 is a frontal view of a sun visor assembly for a motor vehicle constructed in accordance with the teachings of a preferred embodiment of the present invention operatively associated with a motor vehicle.

With initial reference to the environmental view of FIG. 1, a sun visor assembly constructed in accordance with the teachings of the preferred embodiment of the present invention is generally identified with reference numeral 10. The sun visor assembly 10 is illustrated operatively associated with a portion of a motor vehicle 12. However, it will become apparent to those skilled in the art that the illustrated use of the teachings of the present invention is merely exemplary. In this regard, the teachings of the subject invention have broader applications.

Figure 2:
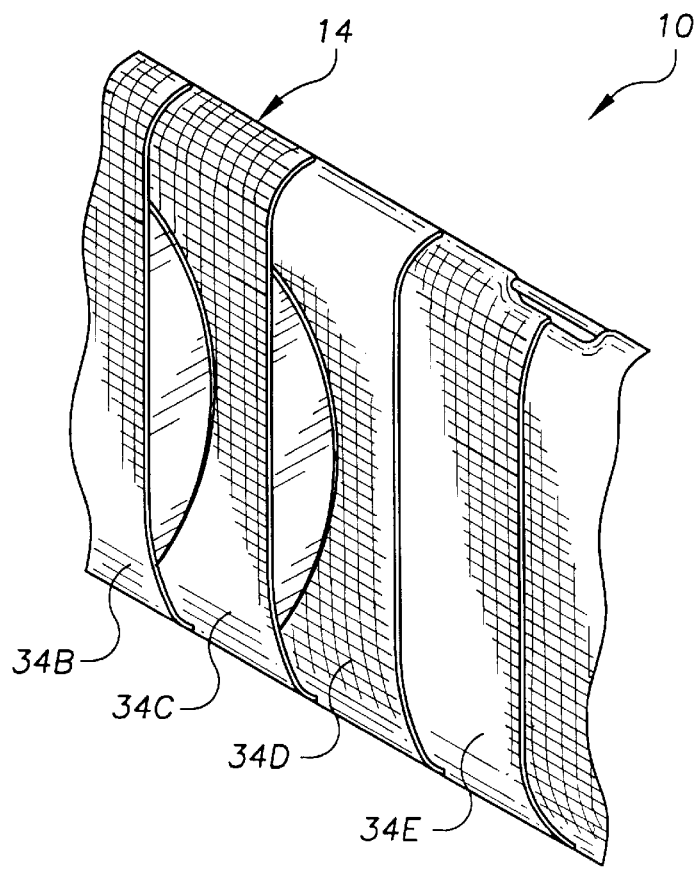
FIG. 2 is an enlarged perspective view of a portion of the sun visor assembly of FIG. 1.
Figure 3:
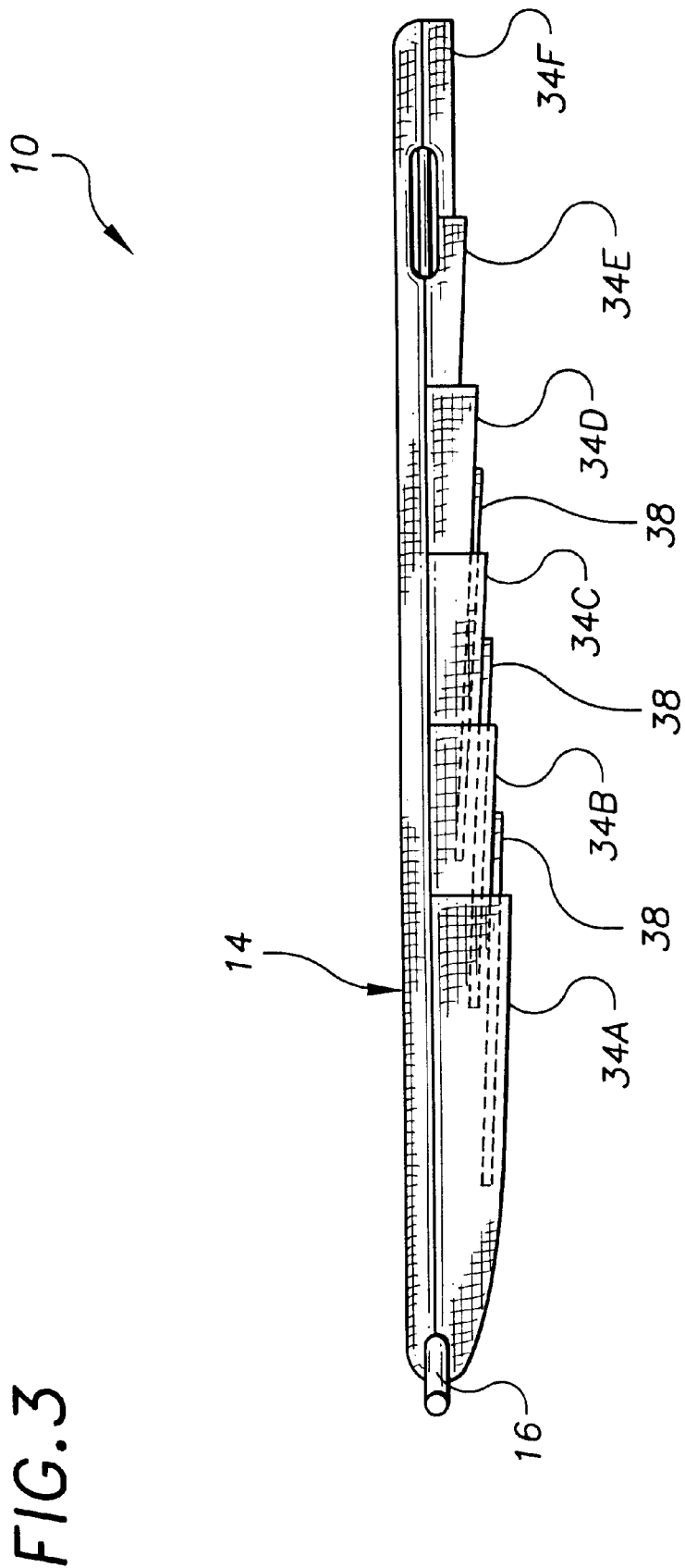
FIG. 3 is a top view of the sun visor assembly of FIG. 1.
Figure 4:
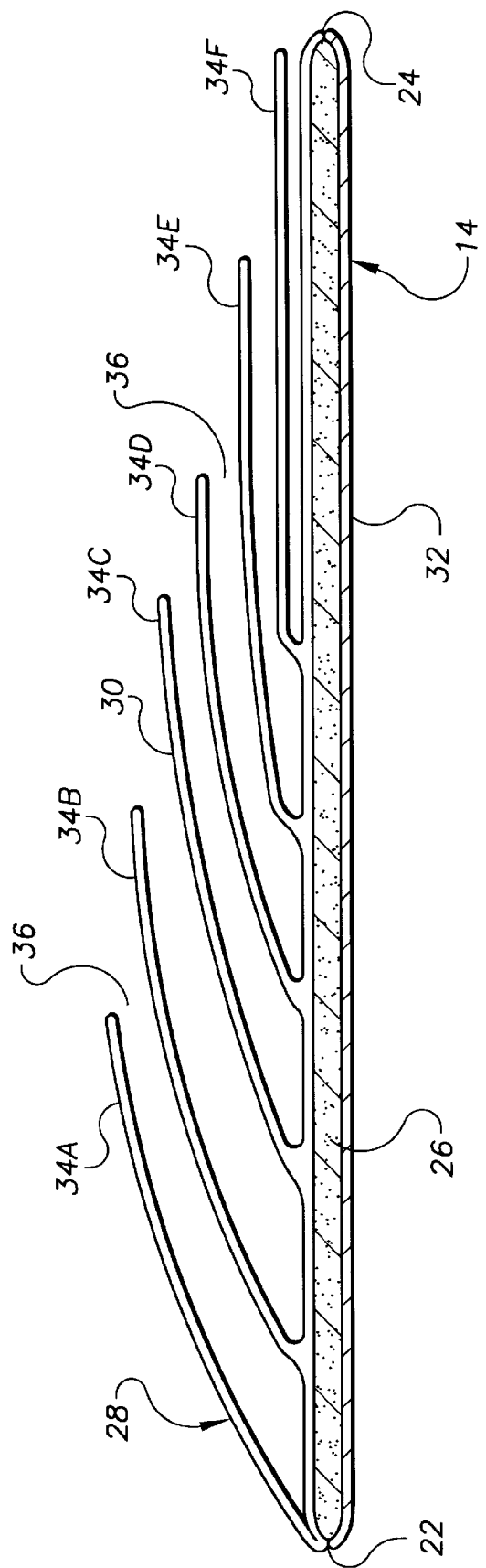
FIG. 4 is a simplified cross-sectional view taken longitudinally through the sun visor assembly, it being understood that the upper portion of fabric is constructed of a continuous piece which is doubled back on itself to form a plurality of pockets without stitching therebetween.

With continued reference to FIG. 1 and additional reference to FIGS. 2 through 4, the sun visor assembly 10 of the present invention is shown to generally include include a blade 14 and a mounting arm 16 for pivotally connecting the blade 14 to the motor vehicle 12 in a conventional manner. The blade 14 is generally rectangular in shape including first and second laterally spaced apart edges 18 and 20 and first and second longitudinally spaced apart edges 22 and 24.

The blade 14 of the sun visor assembly 10 is further shown to include a central core 26 and an outer fabric cover 28. As shown particularly in FIG. 4, the central core is constructed of foam. However, it will be appreciated by those skilled in the art that the central core may additionally incorporate cardboard or other material used for stiffening the blade 14.

The outer fabric cover 28 includes an upper fabric member 30 and a lower fabric member 32. The upper fabric member defines a plurality of pockets 34A–34F, each of the pockets 34A–34F defines an opening 36 for receiving a compact disc 38. In the exemplary embodiment illustrated, the upper fabric member 30 defines six (6) pockets 34A–34F. However, it will be understood by those skilled in the art that any particular number of pockets may be incorporated.

With particular reference to the simplified cross-sectional view of FIG. 4, the upper fabric member 30 of the outer fabric cover 28 is preferably shown to comprise a continuous length of material. It will be understood that the single line identified in FIG. 4 at reference numeral 30 represents a thickness of material. In this regard, cross-hatching has been omitted from this portion of the drawings. It will further be understood that where upper fabric member 30 appears as a double line in FIG. 4, the member 30 is folded over on itself.

As illustrated, the upper fabric member 30 is secured to the lower fabric member 32 at the second longitudinally spaced apart edge 24 and is doubled over on itself so as to define the shingled pockets 34A–34F. At the opposite edge 22, the upper fabric member 30 is similarly sewn to the lower fabric member 32. To retain the defined pockets 34A–34F constructed of the continuous length of material, the upper fabric member 30 is additionally secured to the lower fabric member 32 at seams (not specifically shown) extending longitudinally along the first and second laterally spaced apart sides 18 and 20.

In the exemplary embodiment illustrated, the openings 36 for each of the pockets 34A–34F extend substantially perpendicular to the laterally spaced apart sides 18 and 20. However, it will be appreciated by those skilled in the art that alternatively the openings 36 may be oriented at angles relative to the first and second laterally spaced apart sides 18 and 20. Further, in the preferred embodiment, the opening 36 for the pocket 34F is disposed at the second longitudinally spaced apart edge 24 of the blade 14, thereby increasing the compact disc storing capacity of the sun visor assembly 10.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A sun visor assembly for a motor vehicle adapted to store a plurality of compact discs, the sun visor assembly comprising:

a central core; and an outer fabric cover surrounding said central core, said outer fabric cover including an upper fabric member having a continuous length, said upper fabric member being folded over on itself to define a plurality of shingled pockets, each pocket including an opening for receiving one of the plurality of compact discs.

2. The sun visor assembly for a motor vehicle of claim 1, wherein said opening for a first shingled pocket of said plurality of shingled pockets is at an edge of the sun visor assembly.

3. The sun visor assembly for a motor vehicle of claim 1, wherein said outer fabric cover further comprises a lower fabric member, said upper and lower fabric members being joined to one another at first and second laterally spaced apart sides of said sun visor assembly.

4. The sun visor assembly for a motor vehicle of claim 1, wherein said sun visor assembly includes first and second laterally spaced apart sides and further wherein said openings of said plurality of shingled pockets are each oriented substantially perpendicular to said first and second laterally spaced apart sides.

5. The sun visor assembly for a motor vehicle of claim 4, wherein said sun visor assembly further includes first and second longitudinally spaced apart sides, and further wherein said upper and lower fabric members are joined to one another at said first and second longitudinally spaced apart sides of said sun visor assembly.

6. A sun visor assembly for a motor vehicle, the sun visor assembly comprising:

a central core; and an outer fabric cover surrounding said central core, said outer fabric cover including an upper fabric member, said upper fabric member being folded over on itself to define a plurality of shingled pockets, each pocket including an opening for receiving one of a plurality of compact discs, said opening for a first shingled pocket of said plurality of shingled pockets being located at an edge of the sun visor assembly.

7. The sun visor assembly for a motor vehicle of claim 6, wherein said upper fabric member is continuous.

8. The sun visor assembly for a motor vehicle of claim 6, wherein outer fabric cover further comprises a lower fabric member, said upper and lower fabric members being joined to one another at first and second laterally spaced apart sides of said sun visor assembly.

9. The sun visor assembly for a motor vehicle of claim 6, wherein said sun visor assembly includes first and second laterally spaced apart sides and further wherein said openings of said plurality of shingled pockets are each oriented substantially perpendicular to said first and second laterally spaced apart sides.

10. The sun visor assembly for a motor vehicle of claim 9, wherein said sun visor assembly further includes first and second longitudinally spaced apart sides, and further wherein said upper and lower fabric members are joined to one another at said first and second longitudinally spaced apart sides of said sun visor assembly.

\* \* \* \* \*